(12) United States Patent
Bates et al.

(10) Patent No.: US 8,563,655 B2
(45) Date of Patent: *Oct. 22, 2013

(54) FILM OF POLY(TRIMETHYLENE ARYLATE)/POLYSTYRENE BLENDS AND PROCESS FOR MAKING

(75) Inventors: W. Douglas Bates, Wilmington, DE (US); Brett Collin Dobrick, Beaumont, TX (US)

(73) Assignee: E I du Pont de Nemours and Company, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/391,320

(22) PCT Filed: Aug. 20, 2010

(86) PCT No.: PCT/US2010/046137
§ 371 (c)(1),
(2), (4) Date: Mar. 14, 2012

(87) PCT Pub. No.: WO2011/022630
PCT Pub. Date: Feb. 24, 2011

(65) Prior Publication Data
US 2012/0283389 A1    Nov. 8, 2012

Related U.S. Application Data

(60) Provisional application No. 61/235,405, filed on Aug. 20, 2009.

(51) Int. Cl.
*C08L 25/04* (2006.01)
*C08L 67/02* (2006.01)

(52) U.S. Cl.
USPC .......................................... 525/165; 525/241

(58) Field of Classification Search
USPC ................................................ 525/165, 241
See application file for complete search history.

(56) References Cited

U.S. PATENT DOCUMENTS

| | | |
|---|---|---|
| 4,475,330 A | 10/1984 | Kimura et al. |
| 6,923,925 B2 | 8/2005 | Chang et al. |
| 2004/0009352 A1 | 1/2004 | Chang et al. |
| 2004/0066556 A1 | 4/2004 | Dontula et al. |
| 2004/0121151 A1 | 6/2004 | Chang et al. |
| 2012/0292808 A1 * | 11/2012 | Bates et al. ............ 264/143 |
| 2012/0296043 A1 * | 11/2012 | Bates et al. ............ 525/177 |

FOREIGN PATENT DOCUMENTS

| | | |
|---|---|---|
| CN | 1445280 A | 10/2003 |
| JP | 2003020389 A | 1/2003 |

* cited by examiner

*Primary Examiner* — Nathan M Nutter

(57) ABSTRACT

A film of poly(trimethylene arylate) and a polystyrene wherein the polystyrene concentration is in the range of 0.5 to 40 weight %. Poly(trimethylene terephthalate) and polystyrene are particularly useful. Also, disclosed are processes for preparing the film.

14 Claims, 2 Drawing Sheets

FILM OF POLY(TRIMETHYLENE ARYLATE)/POLYSTYRENE BLENDS AND PROCESS FOR MAKING

The present application claims the benefit of U.S. provisional patent application No. 61/235,405, filed Aug. 20, 2009 which is herein incorporated by reference. Further, the present application is related to U.S. Patent provisional application No. 61/235,399, filed Aug. 20, 2009, which is designated by Applicant as CL4708, entitled "Poly(trimethylene arylate)/Polystyrene Concentrate and Process for Preparing", and to U.S. Patent provisional application No. 61/235,403, filed Aug. 20, 2009, which is designated by Applicant as CL4697, entitled "Masterbatch Process for Producing Shaped Articles of Poly(trimethylene arylate)".

FIELD OF THE INVENTION

The present invention is directed to a film prepared from a polymer blend comprising poly(trimethylene arylate) and polystyrene.

BACKGROUND OF THE INVENTION

Poly(trimethylene terephthalate), also known as poly(propylene terephthalate), or, less formally, as "3GT" polymer, is well known in the art. The properties and manufacturing thereof are described by Chuah in *The Encyclopedia of Polymer Science*, on-line, DOI 10.1002/0471440264.pst292.

J. C. Chang et al., U.S. Pat. No. 6,923,925, describes a composition comprising poly(trimethylene dicarboxylate), especially poly(trimethylene arylate), most especially poly(trimethylene terephthalate) (PTT), with 0.01-10% by weight of preferably high molecular weight polystyrene (PS) dispersed within the poly(trimethylene dicarboxylate), and having a PS particle size of less than 2 micrometers ($\mu$m). Only compositions in the concentration range of 1-2% PS are exemplified. It was found that PTT compositions comprising 1-2% by weight of PS, on the basis of total polymer weight, were capable of melt spinning into fiber at spinning speeds significantly higher than that achievable with PTT without PS. The manner by which the compositions were prepared was by co-feeding pellets of the two polymers into a twin screw extruder or by making a salt and pepper blend of pellets of the two polymers in the desired proportions and then feeding the resulting pellet mixture into a twin screw extruder. The extrudate was extruded as a strand and chopped into pellets. These blend pellets were then fed to a spinning machine to melt spin fiber.

U.S. Pat. No. 4,475,330 discloses a polyester multifilament yarn made from polyester filaments consisting essentially of (a) a copolymer of two or more monomers selected from the group consisting of ethylene terephthalate, trimethylene terephthalate and tetramethylene terephthalate, and/or (b) a blend of two or more polymers of ethylene terephthalate, trimethylene terephthalate and tetramethylene terephthalate. This patent describes blends of polyesters with 3 to 15% of non-crystalline polymer, preferably styrene polymers or methacrylate polymers.

The process of Chang et al., op. cit., was developed to produce poly(trimethylene dicarboxylate) yarns, particularly partially oriented yarns, at high spin speeds. The advantages of the invention were obtained using a blend comprising poly(trimethylene dicarboxylate) and (PS). Achievement of commercial scale operation of the process of Chang et al., may present several problems. It could be very expensive to transition a commercial scale continuous melt polymerizer from a PTT product containing PS to a PTT product not containing PS. Employing a side-stream extruder and feeding in the required amount of PS to arrive at a 1% PS composition could require specially designed equipment to feed in the small proportion of PS needed.

There remains a need for films exhibiting improved toughness and increased opacity over films of neat poly(trimethylene arylate) polymers such as provided by the present invention.

SUMMARY OF THE INVENTION

In one aspect, the present invention provides a film comprising a blend of poly(trimethylene arylate) and 0.5 to 40 weight % polystyrene particles, wherein the polystyrene particles are characterized by a particle size less than 500 nm.

In another aspect, the present invention provides a process comprising combining poly(trimethylene arylate) and 0.5 to 40% by weight of polystyrene, melting the poly(trimethylene arylate) and polystyrene forming a melted poly(trimethylene arylate) and polystyrene, and melt blending the melted poly(trimethylene arylate) and polystyrene in a high shear melt mixer providing a melt blend composition comprising a poly(trimethylene arylate) and a polystyrene dispersed therewithin, conveying the melt blend composition to a film die, and extruding a film.

DETAILED DESCRIPTION

Figure 1A:
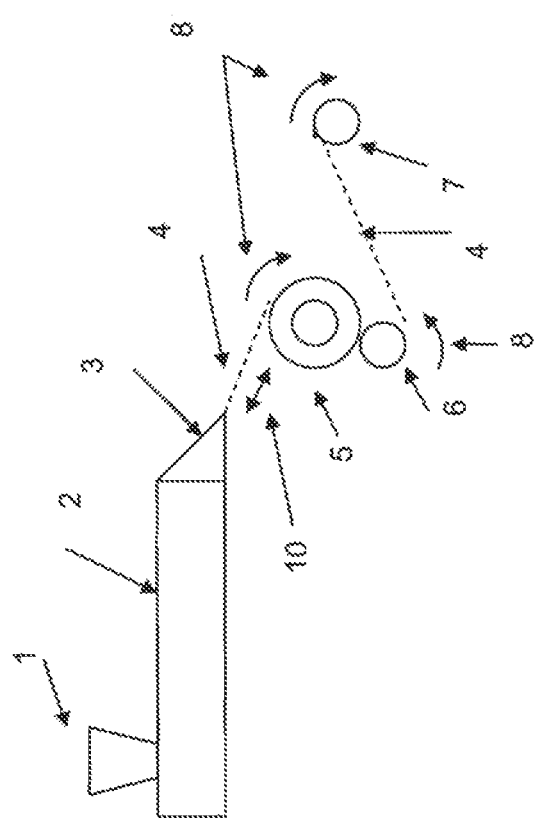
FIGS. 1a and 1b are schematic representations of an embodiment of a process of melt casting a film.
Figure 1D:
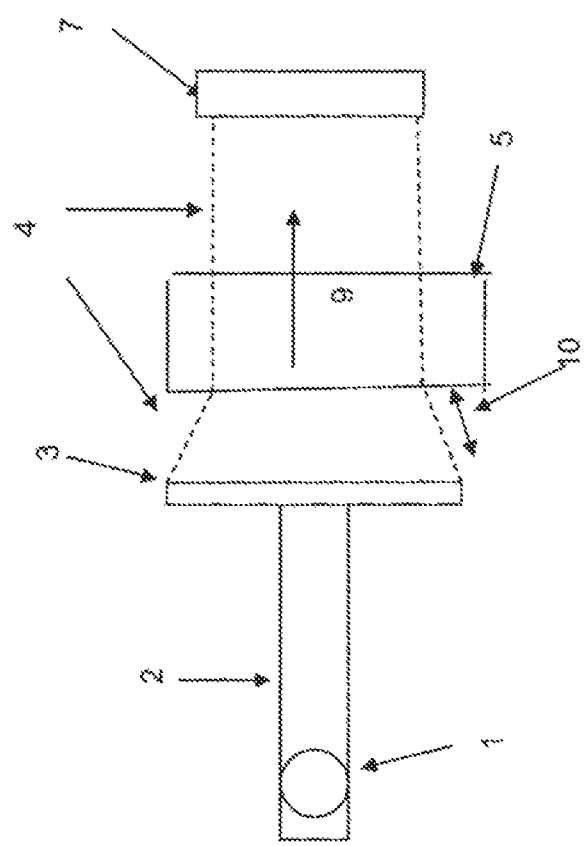

The films of the present invention exhibit improved toughness and increased opacity over films of neat poly(trimethylene arylate) polymers.

Poly(trimethylene arylate) polymers suitable for the practice of the invention include but are not limited to poly(trimethylene terephthalate), poly(trimethylene isophthalate), poly(trimethylene naphthalate), and mixtures and copolymers thereof. In one embodiment, the poly(trimethylene arylate) is poly(trimethylene terephthalate) (PTT).

In the discussion following, the term "PTT," an abbreviation for poly(trimethylene terephthalate), will be employed in lieu of the more generic poly(trimethylene arylate). However, the technology described herein can readily be adapted to other poly(trimethylene arylate) polymers, and the invention is considered to encompass poly(trimethylene arylate) polymers. The term "PTT" encompasses homopolymers and copolymers containing at least 70 mole % trimethylene terephthalate repeat units.

Unless otherwise noted, the polymer compositions are described herein in terms of weight percent (%) of ingredients based upon the total weight of polymers. Thus, the percentage of PS in the composition is expressed as a percentage of the total weight of the polymers, including, for example, PTT, and any other additional polymers that may be incorporated into the composition hereof.

When a range of numerical values is provided, it shall be understood to encompass the end-points of the range unless specifically stated otherwise. Numerical values are to be understood to have the precision of the number of significant figures provided. For example, the number 40 shall be understood to encompass a range from 35.0 to 44.9, whereas the number 40.0 shall be understood to encompass a range from 39.50 to 40.49.

For the purpose of the present invention, the term "copolymer" shall be understood to encompass terpolymers, tetrapolymers and so forth, as well as dipolymers.

In one aspect, the present invention provides a film comprising a blend of poly(trimethylene arylate) and particles of polystyrene dispersed therewithin, the polystyrene particles being characterized by a particle size less than 500 nm.

In one embodiment, the film comprises PTT and 0.5 to 40% by weight of PS dispersed therewithin. In the film, the PTT is present as a continuous phase or "matrix" and the PS is a discontinuous phase dispersed within the PTT matrix. In one embodiment, the film comprises 15 to 40% by weight of PS dispersed therewithin. In one embodiment, the film comprises 20 to 30% by weight of PS dispersed therewithin. In one embodiment, the film comprises 0.5 to 5% by weight of PS. In a further embodiment, the film comprises 0.5 to 1.5% by weight of PS.

In one embodiment, the film comprises up to 30 weight % of other polyesters. Other polyesters include but are not limited to poly(ethylene terephthalate), poly(butylene terephthalate), and poly(ethylene naphthalate). In a further embodiment, the film comprises 50 to 80% of the PTT, and 20 to 30% of PS, and up to 30% of other polyesters, supra.

Suitable PTT polymer is formed by the condensation polymerization of 1,3-propanediol and terephthalic acid or dimethyl terephthalate. One or more suitable comonomers for copolymerization therewith is selected from the group consisting of linear, cyclic, and branched aliphatic dicarboxylic acids or esters having 4-12 carbon atoms (for example butanedioic acid, pentanedioic acid, hexanedioic acid, dodecanedioic acid, 1,4-cyclohexanedicarboxylic acid, and their corresponding esters); aromatic dicarboxylic acids or esters other than terephthalic acid or ester and having 8-12 carbon atoms (for example isophthalic acid and 2,6-naphthalenedicarboxylic acid); linear, cyclic, and branched aliphatic diols having 2-8 carbon atoms (other than 1,3-propanediol, for example, ethanediol, 1,2-propanediol, 1,4-butanediol, 3-methyl-1,5-pentanediol, 2,2-dimethyl-1,3-propanediol, 2-methyl-1,3-propanediol, and 1,4-cyclohexanediol); and aliphatic and aromatic ether glycols having 4-10 carbon atoms (for example, hydroquinone bis(2-hydroxyethyl)ether, or a poly(ethylene ether)glycol having a molecular weight below about 460, including diethyleneether glycol). The comonomer typically is present in the PTT copolymer at a level in the range of about 0.5 to about 15 mole %, and can be present in amounts up to 30 mole %.

The PTT can contain minor amounts of other comonomers; such comonomers are usually selected so that they do not have a significant adverse affect on properties. Such other comonomers include 5-sodium-sulfoisophthalate, for example, at a level in the range of about 0.2 to 5 mole %. Very small amounts of trifunctional comonomers, for example trimellitic acid, can be incorporated for viscosity control. The PTT can be blended with up to 30 mole percent of other polymers. Examples are polyesters prepared from other diols, such as those described supra.

In one embodiment, the PTT contains at least 85 mol-% of trimethylene terephthalate repeat units. In a further embodiment, the PTT contains at least 90 mol-% of trimethylene terephthalate repeat units, In a still further embodiment the PTT contains at least 98 mol-% of trimethylene terephthalate repeat units. In a still further embodiment the PTT contains 100 mol-% of trimethylene terephthalate repeat units.

In one embodiment, suitable PTT is characterized by an intrinsic viscosity (IV) in the range of 0.70 to 2.0 dl/g. In a further embodiment, suitable PTT is characterized by an IV in the range of 0.80 to 1.5 dl/g. In a still further embodiment, suitable PTT is characterized by an IV in the range of 0.90 to 1.2 dl/g.

In one embodiment, suitable PTT is characterized by a number average molecular weight ($M_n$) in the range of 10,000 to 40,000 Da. In a further embodiment suitable PTT is characterized by $M_n$ in the range of 20,000 to 25,000 Da.

In one embodiment, a polystyrene is selected from the group consisting of polystyrene homopolymer, α-methylpolystyrene, and styrene-butadiene copolymers and blends thereof. In one embodiment, the polystyrene is a polystyrene homopolymer. In a further embodiment, the polystyrene homopolymer is characterized by $M_n$ in the range of 5,000 to 300,000 Da. In a still further embodiment, $M_n$ of the polystyrene homopolymer is in the range of 50,000 to 200,000 Da. In a still further embodiment $M_n$ of the polystyrene homopolymer is in the range of 75,000 to 200,000 Da. In a still further embodiment, $M_n$ of the polystyrene homopolymer is in the range of 120,000 to 150,000 Da. Useful polystyrenes can be isotactic, atactic, or syndiotactic. High molecular weight atactic polystyrene is preferred.

Polystyrenes useful in this invention are commercially available from many suppliers including Dow Chemical Co. (Midland, Mich.), BASF (Mount Olive, N.J.) and Sigma-Aldrich (Saint Louis, Mo.).

In one embodiment, PTT and PS are melt blended and, then, extruded in the form of a strand that is subsequently cut into pellets. Other forms of melt blending and subsequent comminution, such as into flake, chips, or powder, can also be performed. In one embodiment, the pellets are then remelted and extruded into films, with or without with additional PTT in the melt.

In an embodiment, the polymer blend comprises PTT and PS. In some embodiments these will be the only two materials in the blend and they will total 100 weight %. However, in many instances the blend will have other ingredients such as are commonly added to polyester polymers in commercial use. Such additives include but are not limited to other polymers, plasticizers, UV absorbers, flame retardants, dyestuffs, and so on. Thus, the total of the PTT and PS will be less than 100 weight %.

In a further aspect, the invention provides a process comprising combining poly(trimethylene arylate) and a PS in concentration of 0.5 to 40% by weight, melting the poly(trimethylene arylate) and PS; melt blending the melted poly(trimethylene arylate) and PS in a high shear melt mixer to provide a melt composition comprising a poly(trimethylene arylate) and a PS dispersed therewithin. In one embodiment, the PTT/PS blend so produced is extruded into one or more strands about ⅛" to 3/16" in diameter that are then cut up into pellets.

The pellets so produced can be employed as they are to cast films; or, if they are relatively high in PS concentration, the pellets so produced can also be employed as a concentrate or masterbatch which can be diluted in the melt by addition of neat PTT polymer.

In alternative embodiments, both the PTT/PS composition may be in the form of chips, flakes, or powder instead of pellets. In the discussion herein, wherever pellets are recited, any or all of the alternative forms may be substituted therefor. However, it is found in the polymer art, that extrusion-processing performance is best when the polymeric components are fed as pellets rather than chips, flakes, or powder.

In an alternative embodiment, the PTT/PS blend is not pelletized but is directed while still in the melt to a film die from which a film is extruded, as described infra.

In one embodiment of the process hereof, the poly(trimethylene arylate) is PTT.

In one embodiment of the process hereof, the PS is at a concentration of 0.5% to 40% by weight.

In one embodiment of the process hereof, the PS is at a concentration of 15% to 40% by weight In one embodiment of the process hereof, the PS is at a concentration of 20% to 30% by weight.

In one embodiment of the process hereof, the PS is at a concentration of 0.5 to 5% by weight.

In one embodiment of the process hereof, the PS is at a concentration of 0.5 to 1.5% by weight.

In one embodiment of the process hereof, the PTT is characterized by an IV in the range of 0.90 to 1.2 dl/g.

In one embodiment of the process hereof, the PS is PS homopolymer.

In a further embodiment of the process hereof, the PS homopolymer is characterized by a number average molecular weight of 75,000 to 200,000 Da.

In one embodiment of the process hereof, the polystyrene is polystyrene homopolymer at a concentration of 20 to 30% and is characterized by a number average molecular weight of 75,000 to 200,000 Da; the poly(trimethylene arylate) is poly(trimethylene terephthalate) comprising 98 mol-% of trimethylene terephthalate monomer units and whereof the intrinsic viscosity is in the range of 0.90 to 1.2 dl/g.

The PTT and PS can be melt blended by any known technique, including but not limited to an embodiment (a) comprising melting and mixing simultaneously from separate feeds, as, for example, in a co-fed twin screw extruder; an embodiment (b) comprising pre-mixing the unmelted polymers in a separate apparatus before melt blending, as, for example, in tumble blending pellets or flake of the polymers prior to feeding a twin-screw extruder, or an embodiment (c) comprising melting each polymer separately and then mixing the melts, as, for example, in feeding a twin screw extruder with the PTT in molten form from a continuous melt polymerizer, and feeding the twin-extruder with PS in molten form from a satellite single or twin screw extruder.

Important aspects of the composition hereof include, but are not limited to, the size of the PS particles formed within the PTT matrix, and the volume homogeneity of the PS particle distribution within the PTT matrix. Average particle size greater than 500 nm is not desirable from the standpoint of good film forming performance. Additionally, uniform film depends expressly upon the homogeneity of the volume distribution of the PS particles. It is expected that in the actual melt processing thereof, the PS particles melt to form molten droplets that are dispersed within a molten PTT matrix.

The temperature in the melt mixer should be above the melting points of both the PTT and the PS but below the lowest decomposition temperature of any of the ingredients. Specific temperatures will depend upon the particular attributes of the polymers employed. In typical practice, melt temperature is in the range of 200° C. to 270° C.

Both fine particle size of PS and volume homogeneity of the dispersion of PS in the PTT depend upon the application of high shear melt blending. This is especially true for the high concentrations of PS employed in the compositions hereof. The amount of shear force applied to the melt depends upon the rotational speed of the mixing elements, the viscosity of the melt, and the residence time of the melt in the mixing zone. If the shear forces are too low there is a tendency for the PS to not break up to begin with, or to agglomerate rapidly into droplets greater than 500 nm in size.

The melt blending process can be performed both batchwise and continuously. High shear mixers such as are commonly employed in the art of polymer compounding are suitable. Examples of suitable commercially available high shear batch mixers include, but are not limited to, Banbury mixers and Brabender mixers. Examples of continuous high shear mixers include co-rotating twin-screw extruders and Farrel Continuous Mixers Counter-rotating twin screw extruders are also suitable. In general, suitable high shear mixers are those that are capable of exerting on a polymer melt a minimum shear rate of 50/s, with 100/s preferred.

Prior to melt casting film, the polymer blend pellets are dried to a moisture level of <30 ppm to avoid hydrolytic degradation during film fabrication. Any means for drying known in the art is satisfactory. In one embodiment, a closed loop hot air dryer is employed. Typically, the PTT/PS blend is dried at 130° C. and a dew point of <−40° C. for 6 h. The thus dried PTT/PS polymer blend is melt cast at 250-265° C. into films using conventional processing machines FIG. 1a shows a schematic side view of an embodiment of the film casting process hereof. FIG. 1b shows a schematic top view. In the embodiment hereof wherein the PTT and PS are melt blended, extruded into strand and pelletized before remelting and casting into film, the pellets so prepared are placed in a feeder, 1, and fed to an extruder, 2, in which the pellets are melted and conveyed to a film die, 3, from which a film, 4, is extruded. The film, 4, is directed to a rotating water-cooled casting drum, 5. The film is held to the casting drum surface by a nip roll, 6, and from the nip roll, is directed to a tension-controlled wind-up, 7. The direction of rotation of the various rolls is indicated by the curved arrows, 8. The direction of film movement is indicated by the arrow, 9. The air gap, 10, between the die lips and the casting drum is greatly exaggerated for purposes of illustration.

When the PTT/PS blend is pelletized, and the pellets thereof are then fed via feeder, 1, to the extruder, 2, the extruder can be a twin screw extruder or a single screw extruder, the single screw extruder being preferred. When the PTT/PS blend is made in situ in extruder, 2, then the extruder is a twin screw extruder. Additionally, when the PTT/PS blend is made in situ in the extruder, the single feeder, 1, is replaced by two feeders, preferably weight loss feeders, one feeding PS and the other feeding PTT. The feeders are set at the respective rates necessary to achieve the desired concentration of PS.

The properties of the produced film are determined by the molecular weight of the PTT, the concentration of the PS, the die pressure, the die design, the die lip opening, the amount of draw-down from the die, the length of air gap, 10, and, the temperature of the casting drum.

The invention is further described but not limited by the following embodiments.

EXAMPLES

Example 1-6

Sorona® Bright PTT resin (1.02 IV available from the DuPont Company, Wilmington, Del.) polytrimethylene terephthalate was combined with polystyrene (168 M KG 2 available from BASF) in the amounts shown in Table 1. The PTT was dried in a vacuum oven with a nitrogen purge at 120° C. for 14 hours prior to use. The two polymers were individually weight-loss fed to the fourth barrel section of a Werner & Pfleiderer ZSK-30 co-rotating twin screw extruder. The feed rates employed are shown in Table 1 in pounds per hour (pph). The extruder had a 30 mm diameter barrel constructed with 13 barrel sections provided in alternating arrangement with two kneading zones and three conveying sections, the extruder having an L/D ratio of 32. Each barrel section was independently heated. Sections 1-4 were set at 25° C., Sections 5-13 were set at 210° C., the 3/16" strand die was also set at 210° C. A vacuum was applied to barrel segment 8. The screw speed was as indicated in Table 1. Table 1 also shows the composition of the feed, the rate of output, and the melt temperature. The polymer was quenched in water immediately upon exiting the die and was then pelletized using standard pelletizing equipment into 1/8" pellets.

TABLE 1

| Example # | Compostion (PTT/PS) | PTT Set Feed Rate (pph) | Polystyrene Set Feed Rate (pph) | Output Rate (pph) | RPM of screws | Melt Temperature (° C.) |
|---|---|---|---|---|---|---|
| 1 | 85/15 | 25.5 | 4.5 | 30.4 | 200 | 278 |
| 2 | 80/20 | 24.0 | 6.0 | 30.0 | 250 | 277 |
| 3 | 75/25 | 22.5 | 7.5 | 30.2 | 200 | 268 |
| 4 | 70/30 | 14.0 | 6.0 | 20.0 | 200 | 265 |
| 5 | 65/35 | 13.0 | 7.0 | 20.0 | 200 | 263 |
| 6 | 60/40 | 12.0 | 8.0 | 23.0 | 200 | 270 |

Example 7

Sorona® Bright PTT resin (Dupont, Wilmington, Del.) was combined with 20 weight % of the polystyrene used in Examples 1-6. The PTT was dried prior to use as in Examples 1-6. The two polymers were independently fed by weight loss feeders at 28 pph of PTT and 7 pph PS into the 4$^{th}$ barrel section of a Werner & Pfleiderer ZSK-30 co-rotating twin screw extruder provided with 13 independently heated barrel sections. The throat temperature and first barrel temperature were set at 190° C., with the following 12 sections set at 210° C. The polymer was extruded through a single stand die with a 3/16" hole. The polymer strand was then water-quenched and pelletized into 1/8" pellets.

Approximately 10 g of the pellets were placed between two sheets of 0.006 inch thick poly(tetrafluoro ethylene)-coated fiber glass release sheets. These sheets were then placed between the platens of a hydraulic press (PHI, City of Industry, Calif.). The press was heated to 260° C. and 4.5 psi gauge pressure until the pellets had melted and the pressure stabilized. Then the pressure was raised to 22.5 psi gauge pressure, and held for 5 minutes. The pressure was then released, and the release sheets were removed from the press and placed into an ice water bath. A film having a thickness of less than 0.010 in was removed from the release sheet and compared to a similar sheet made of PTT pellets that did not contain polystyrene. The film made with 20% polystyrene was more opaque than the film without polystyrene, while feeling the same with relation to brittleness and tensile properties.

Example 8

0.4 lbs of the PTT/PS pellets produced in Example 7 were mixed with 9.6 lbs of Sorona® Bright PTT resin pellets containing no PS. The resulting pellet mixture was fed to a Werner & Pfleiderer extruder with a 28 mm diameter barrel and 6 barrel segments each set to 240° C. Screw speed was 150 rpm. A melt temperature of 268° C. was determined by hand at the exit of the extruder. The extruder output was fed to a 10 inch coat hanger film die set at 239° C. The die gap was set at 0.010 in and the die pressure was 296 psi. A film was cast onto a water-cooled rotating casting drum, to a wind-up operating at 8 feet per minute. The prepared film was found to exhibit a uniform thickness of 0.002 in and was 10 in wide. A section of the film so produced was examined by transmission electron microscopy (TEM). By visual inspection, the preponderance of PS particles were characterized by 150 nm particle size.

We claim:

1. A film comprising a blend of poly(trimethylene arylate) and 0.5 to 40 weight %, based on the weight of the polymer, polystyrene particles, wherein the polystyrene particles are characterized by a particle size less than 500 nm, with the proviso that the poly(trimethylene arylate) does not include monomer units of tetramethylene arylate.

2. The film of claim 1 wherein the poly(trimethylene arylate) is poly(trimethylene terephthalate).

3. The film of claim 2 wherein the poly(trimethylene terephthalate) comprises at least 98 mol-% of trimethylene terephthalate monomer units having an intrinsic viscosity of 0.90 to 1.2 dl/g.

4. The film of claim 1 wherein the polystyrene is a polystyrene homopolymer.

5. The film of claim 1 wherein the polystyrene has a concentration of 20 to 30 weight %.

6. The film of claim 1 wherein the polystyrene has a concentration of 0.5 to 5 weight %.

7. A process comprising combining poly(trimethylene arylate) and 0.5 to 40% by weight of polystyrene, melting the poly(trimethylene arylate) and polystyrene forming a melted poly(trimethylene arylate) and polystyrene, and melt blending the melted poly(trimethylene arylate) and polystyrene in a high shear melt mixer providing a melt blend composition comprising a poly(trimethylene arylate) and a polystyrene dispersed therewithin, with the proviso that the poly(trimethylene arylate) does not include monomer units of tetramethylene arylate; conveying the melt blend composition to a film die; and extruding a film.

8. The process of claim 7 further comprising pelletizing the melt blend composition and remelting the pellets to convey the melt blend composition to the film die.

9. The process of claim 7 wherein the poly(trimethylene arylate) is poly(trimethylene terephthalate).

10. The process of claim 9 wherein the poly(trimethylene terephthalate) comprises at least 98 mol-% of trimethylene terephthalate monomer units and whereof the intrinsic viscosity is in the range of 0.90 to 1.2 dl/g.

11. The process of claim 7 wherein the polystyrene is polystyrene homopolymer.

12. The process of claim 7 wherein the polystyrene has a concentration of 20 to 30 weight %.

13. The process of claim 7 wherein the polystyrene has a concentration of 0.5 to 5 weight %.

14. The process of claim 11 wherein the polystyrene is characterized by a number average molecular weight in the range of 75,000 to 200,000 Da.

* * * * *